(12) United States Patent
Deligiannis

(10) Patent No.: US 10,807,654 B2
(45) Date of Patent: Oct. 20, 2020

(54) RETRACTABLE AIR FLOW GATE SYSTEM

(71) Applicant: Robert Anthony Deligiannis, Columbus, GA (US)

(72) Inventor: Robert Anthony Deligiannis, Columbus, GA (US)

(*) Notice: Subject to any disclaimer, the term of this patent is extended or adjusted under 35 U.S.C. 154(b) by 0 days.

(21) Appl. No.: 16/677,848

(22) Filed: Nov. 8, 2019

(65) Prior Publication Data
US 2020/0122788 A1   Apr. 23, 2020

Related U.S. Application Data

(63) Continuation-in-part of application No. 14/696,454, filed on Apr. 26, 2015, now abandoned.

(51) Int. Cl.
*B62D 35/00* (2006.01)

(52) U.S. Cl.
CPC .................... *B62D 35/001* (2013.01)

(58) Field of Classification Search
CPC ...................................................... B62D 35/001
See application file for complete search history.

(56) References Cited

U.S. PATENT DOCUMENTS

| | | | | |
|---|---|---|---|---|
| 8,075,046 B2 * | 12/2011 | Pursley | ................ | B62D 35/001 296/180.2 |
| 8,342,594 B2 * | 1/2013 | Benton | ................ | B62D 35/001 296/180.1 |
| 8,403,401 B2 * | 3/2013 | Rinehart | .............. | B62D 35/001 296/180.3 |
| 8,925,999 B2 * | 1/2015 | Nelson | ................. | B62D 35/001 296/180.3 |
| 2004/0075298 A1 * | 4/2004 | Wong | .................... | B62D 35/001 296/180.2 |

* cited by examiner

*Primary Examiner* — Sarah B McPartlin

(57) ABSTRACT

A tractor and trailer coupled together in a tandem towing relationship is provided with a Retractable Air Flow Gate System attached to the tractor which aerodynamically reduces the drag and turbulence on such combination by closing the gap between the cab of the tractor and trailer. The rack is attached to the support frame which is bolted to the tractor frame. The Retractable Air Flow Gate System is attached to the rack. The top adjustable hinges and bottom adjustable hinges are attached to the rack on one side and attached to the extrusions on the opposite side. The two electric gear driven motors are embedded in the top of the extrusions, they are powered by the electrical system from the tractor, this is what operates the air foil gates to open and close. The bottom adjustable hinges support the extrusions, air foil gates and rubber strips. The air foil gates are attached perpendicular to the length of the extrusions and the rubber strips are attached perpendicular to the opposite end of the air foil gates. All the components of the Retractable Air Flow Gate System open and close except the support frame which is attached to the tractor frame, the rack and the one side of the adjustable hinges.

3 Claims, 7 Drawing Sheets

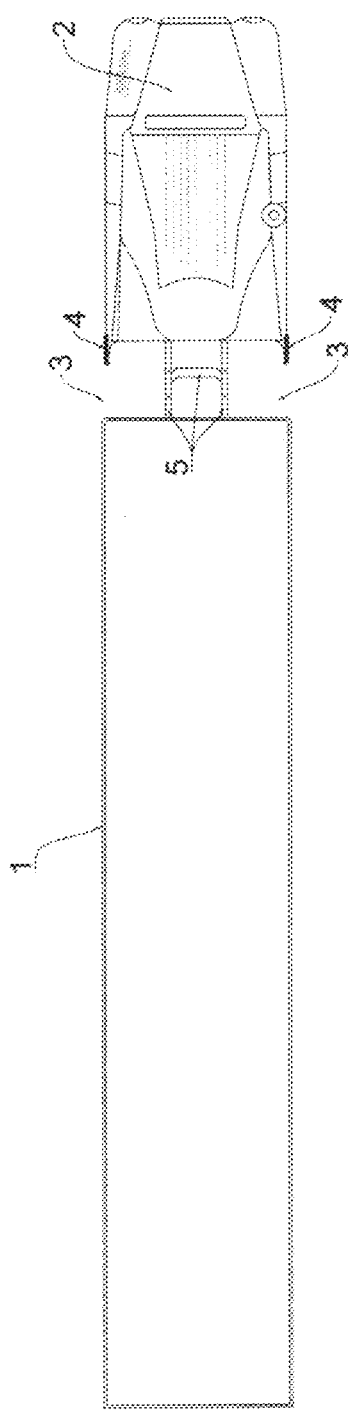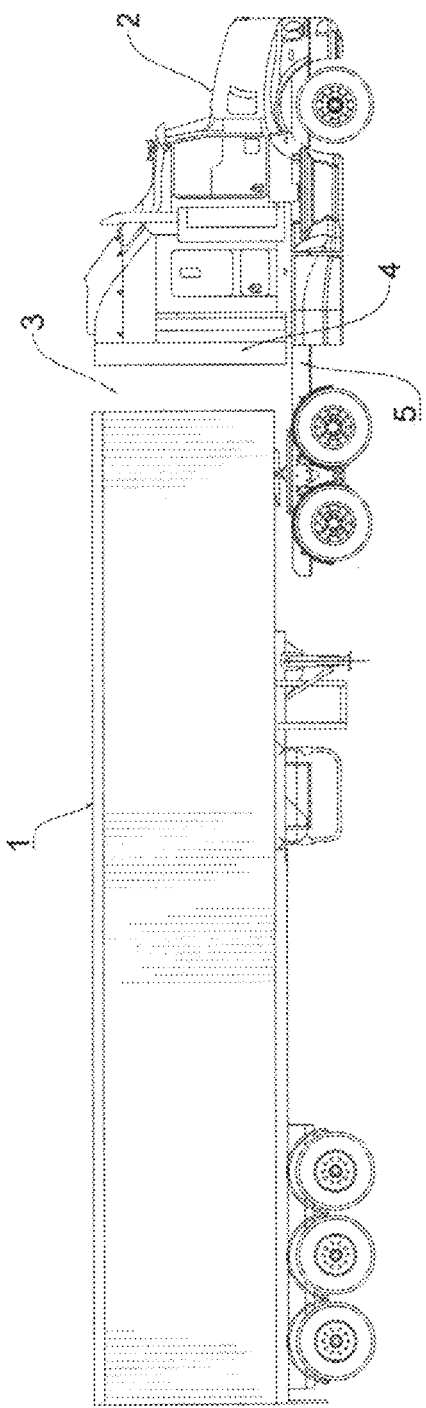

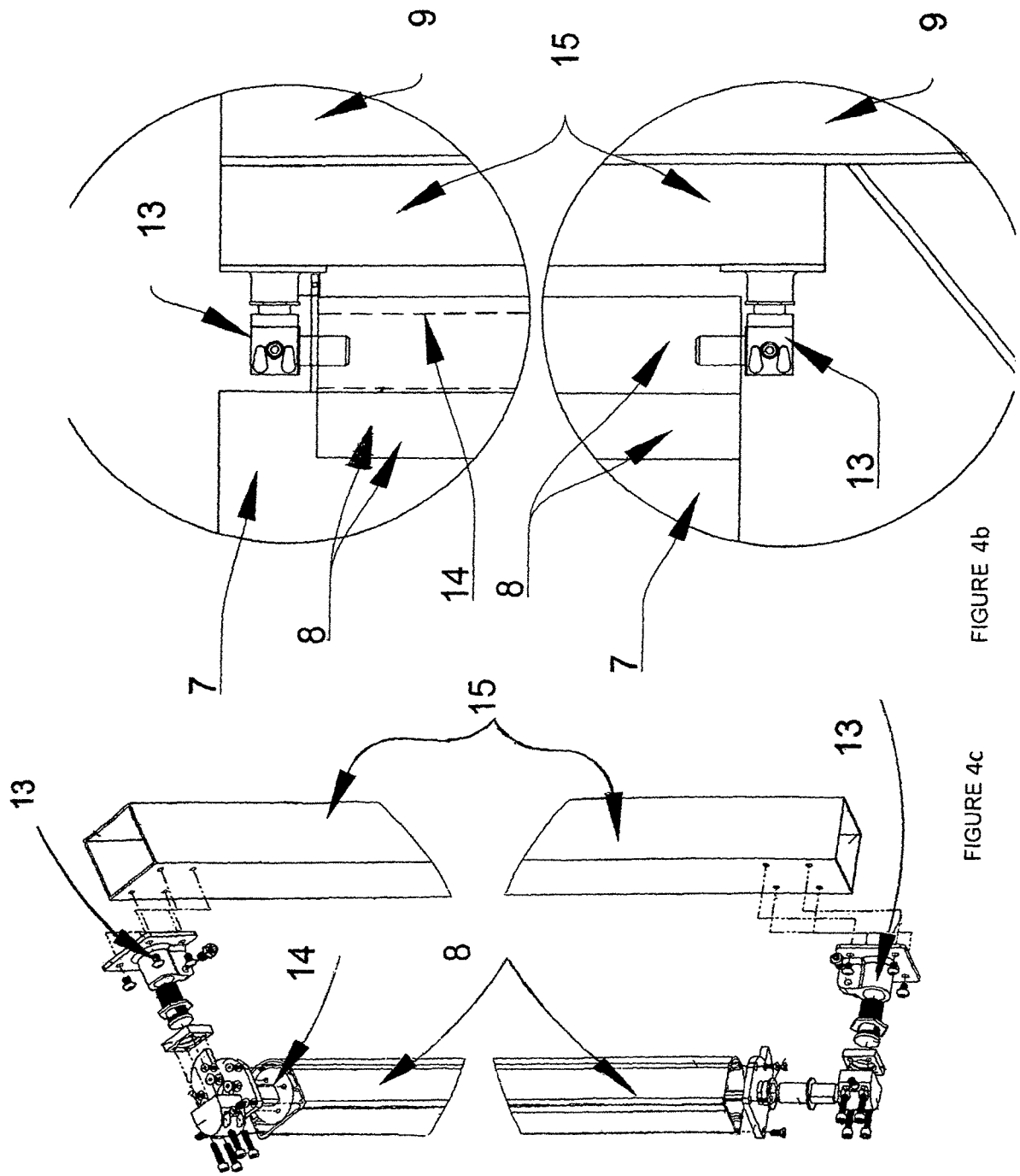

RETRACTABLE AIR FLOW GATE SYSTEM

SUMMARY OF THE INVENTION

The gap between tractors and trailers are a high drag and turbulence region difficult to streamline. Tractor manufactures have made great strides in minimizing the drag and turbulence through aerodynamic cab roofs and side extenders. These fixed cab extenders are planar members which extend aft longitudinally from a back end of the tractor, substantially parallel with the trailer. Ideally, the fixed cab extenders would extend across the entire gap or space between the tractor and trailer, but the tractor-trailer combination described would cause damage. As the tractor turned relative to the trailer, the trailer would impact and cause damage to the fixed cab extenders. Additional improvements are needed to solve these dilemmas.

There are significant gaps of 20" to 48" between the tractor-trailer which still exist today. Air still enters the gap to hit the trailer's front face directly and cross winds add to the problem as well. The Retractable Air Flow Gate System solves this problem by closing the gap between the tractor-trailer combination.

The Retractable Air Flow Gate System is comprised of a support frame mounted to the frame of the drive tractor, just behind the cab of the tractor. This support frame which supports the entire Retractable Air Flow Gate System and is bolted to the tractor frame and is placed between the cab extenders, but does not come in contact with the cab of the tractor.

Various fairing and streamline devices have been constructed to reduce the aerodynamic drag and turbulence that results in a typical tractor-trailer combination. Many of these devices have been attached to various parts of the tractor roofs and cab extenders resulting in different problems. These over the road tractors are equipped with air ride systems to ensure a more comfortable and smoother ride for the driver of the vehicle. Some of these problems are, adding more weight to the cab of the tractor causing a stiffer or harder ride for the driver, which defeats the comfortable air ride. Another problem is when the tractor-trailer combination is traveling down an uneven highway, the air ride system of the tractor cab is moving up and down causing damage to these various devices and fairings hitting the front of the trailer. The Retractable Air Flow Gate System takes all of these concerns into consideration and accounts for these concerns.

DESCRIPTION

The invention relates to aerodynamically reducing the drag on an over the road tractor coupled together in tandem with a trailer. This invention entails changing the aerodynamic characteristics of the tractor and trailer combination by implementing the Retractable Air Flow Gate System which will create a more even flow of air between the tractor and trailer, thus reducing the drag and turbulence between the tractor-trailer combination. This Retractable Air Flow Gate System automatically opens the air foil gates at designated speeds and closes at designated speeds. This method of deployment prevents any damage to the Retractable Air Flow Gate System or to the tractor and trailer.

Tractor-trailers must be capable of operating in a variety of environments. For example, coupled vehicles must be capable of carrying loads at relatively high speed over long distances. For instance, tractor-trailer combinations typically must be able to haul freight over highways such as toll roads or freeways with some posted speed limits 55 mph to 80 mph. Such highways are relatively straight and do not require much turning or maneuvering. Such tractor-trailers must also be able to haul freight over surface streets requiring higher maneuverability, such as making right and left turns in relatively confined spaces. Fuel efficiency is a very important concern when operating tractor-trailer combinations. According to The Technology and Maintenance Council of the American Trucking Association, the fuel consumption increases approximately 0.1 mpg for every 1 mph above 55 mph. In other words, increasing vehicle speed from 65 mph to 70 mph increases fuel consumption and reduces the fuel mileage by 0.5 mpg. A large portion of the cost for moving freight is the fuel costs.

The Retractable Air Flow Gate System is comprised of a support frame, the rack hinges, extrusions, electric gear driven motors, air foil gates, rubber strips, computer and speed sensor housed in a weather proof control box and are used with a drive tractor coupled together in a tandem towing in relationship with a trailer, such as a tractor-trailer combination. The complete support rack system is welded to the support frame which is bolted to the frame of the tractor. The support frame is what supports the entire Retractable Air Flow Gate System.

The Retractable Air Flow Gate System is placed just behind the tractor cab, between the right and left cab extenders. These fixed cab extenders are planar members which extend aft longitudinally from the back end of the tractors cab substantially parallel with the trailer.

The adjustable hinges come assembled and are mounted to the rack. The adjustable hinges are connected to the electric gear driven motors which are embedded in the extrusions. When the tractor-trailer reaches 55 mph the speed sensor automatically signals the electric gear driven motors, the air foil gates and the rubber strips to open at the same time. When the tractor-trailer decreases to 50 mph the sensor automatically signals the electric gear driven motors, extrusions, the air foil gates and the rubber strips to close at the same time.

The extrusions, air foil gates and rubber strips are mounted perpendicular to the rack.

BRIEF DESCRIPTION OF THE DRAWINGS

The following is a brief description of the drawings:

FIG. 1 This is a side view of the open gap (3) between the tractor (2) and trailer (1) combination including the cab extenders (4) and frame (5) of the tractor (2).

FIG. 1a This is a top view of the open gap (3) between the tractor (2) and trailer (1) combination including cab extenders (4) and frame (5) of the tractor (2).

FIG. 4b This is an enlarged view of the Retractable Air Flow Gate System, top and bottom, the support frame (9), the rack (15), the adjustable hinges (13), the electric gear driven motor (14), the extrusion (8) and the air foil gates (7).

FIG. 4c This view depicts the top and bottom of the critical components of the hinges (13), the electric gear driver motor (14), extrusion (8) and the rack (15). The embedded electric gear driven motor (14) at the top is what opens and closes the Retractable Air Flow Gate System.

Figure 2A:
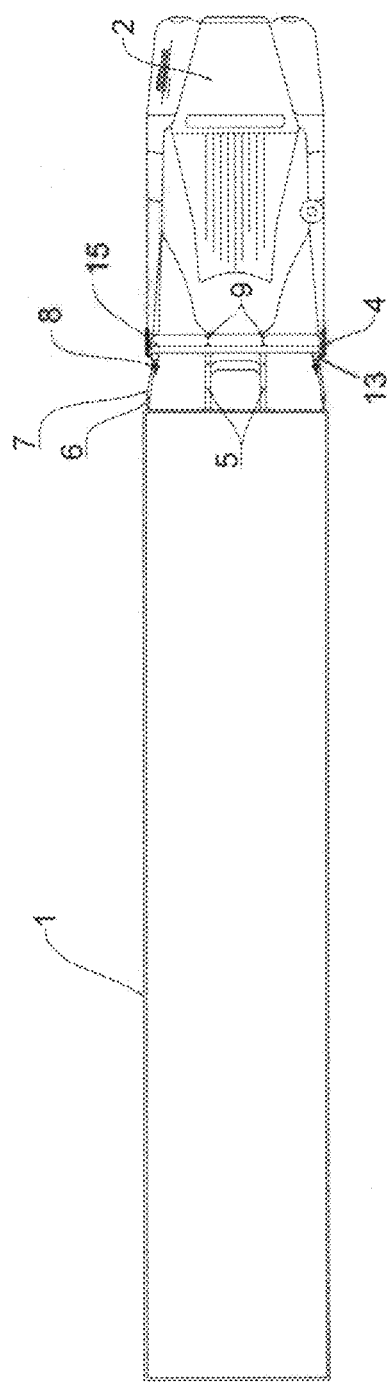
FIG. 2a This is the top view of the complete assembled Retractable Air Flow Gate System. The open position closes the gap between the tractor (2) and the trailer (1) when hauling freight on open highways. The cab extenders (4), the tractor (2) frame (5), the rubber strips (6), the air foil gates (7), the extrusions (8) are bolted to the adjustable hinges (13) which are bolted to the rack (15) and attached to the support frame (9) which are bolted to the frame (5) of the tractor (2).
Figure 2:
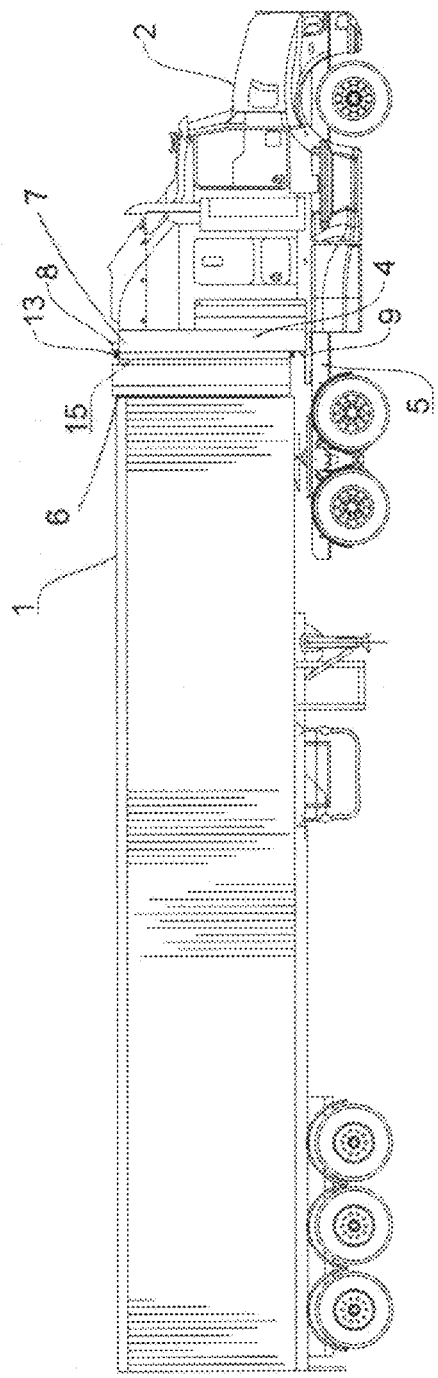
FIG. 2 This is a side view of the complete assembled Retractable Air Flow Gate System. This open position closes the gap between the tractor (2) and the trailer (1) when hauling freight on open highways. The cab extenders (4), the tractor (2) frame (5) the rubber strips (6), the air foil gates (7) the extrusions (8) are bolted to the adjustable hinges (13) which are bolted to the rack (15) and is attached to the support frame (9) which is bolted to the tractor (2).
Figure 3A:
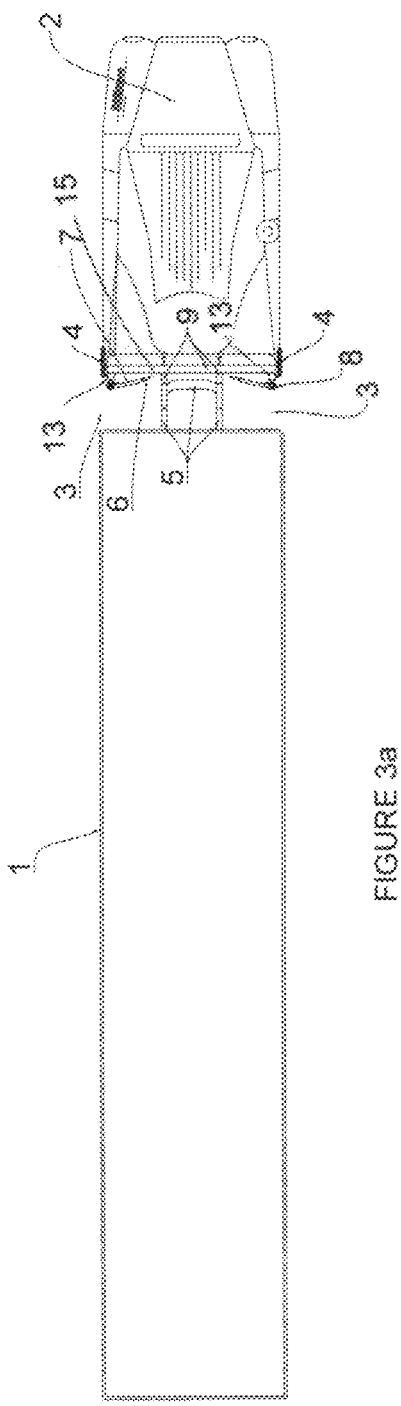
FIG. 3a This is a top view of the completely assembled Retractable Air Flow Gate System. The closed position opens the gap (3) between the tractor (2) and trailer (1) for local street deliveries and congested areas. The rubber strips (6), air foil gates (7), extrusions (8), adjustable hinges (13) are next to the tractor (2) cab extenders (4) which partially conceal the Retractable Air Flow Gate System. The tractor (2) frame (5) the support frame (9) and the rack (15) are stationary.
Figure 3:
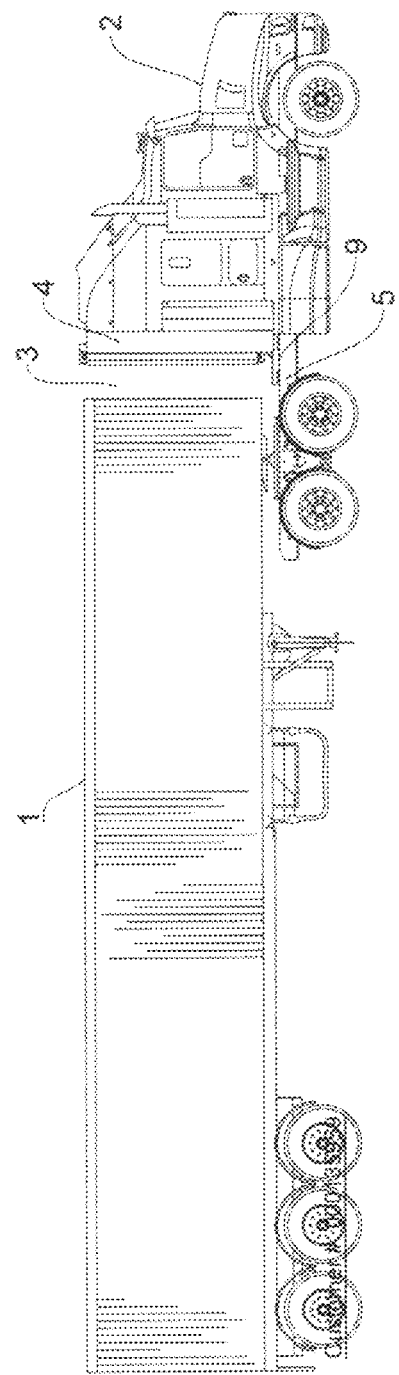
FIG. 3 This is a side view of the completely assembled Retractable Air Flow Gate System. The closed position opens the gap (3) between the tractor (2) and the trailer (1) for local street deliveries and congested areas. The cab extenders (4) partially conceal the Retractable Air Flow Gate System. The tractor (2) frame (5), support frame (9) and rack (not shown) are stationary.
Figure 4:
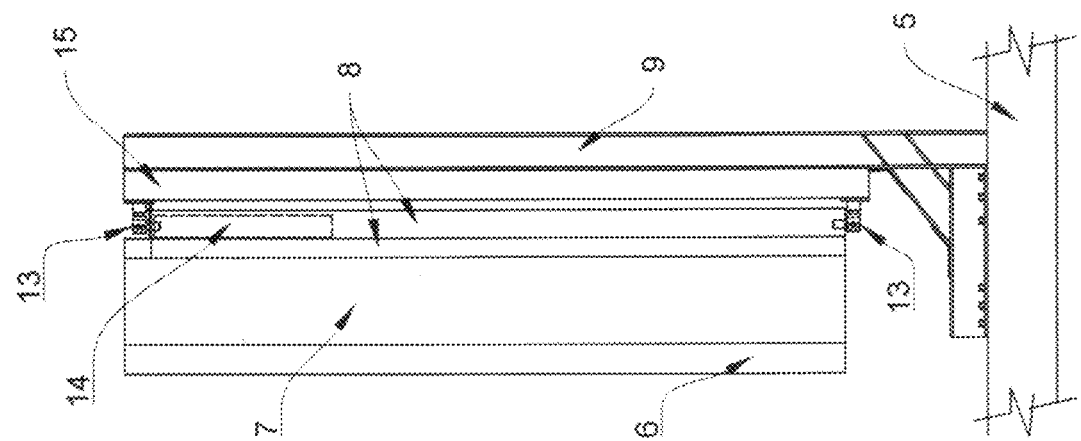
FIG. 4 This is a side view of the Retractable Air Flow Gate System showing the support frame (9) bolted to the tractor frame (5). The top and bottom hinges (13) are bolted to the rack (15) which is attached to the support frame (9) and to the extrusion (8). The electric gear driven motor (14) is embedded in the top of the extrusion (8). The bottom adjustable hinge supports (13) the extrusion (8), the air foil gates (7) and the rubber strip (6).
Figure 4A:
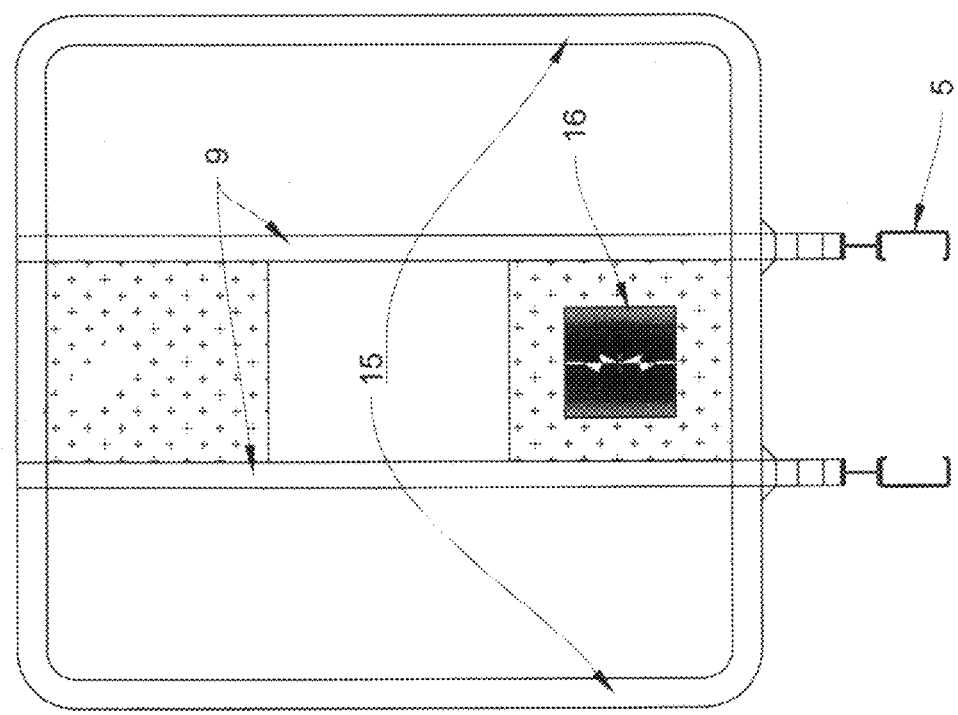
FIG. 4a The support frame (9) supports the entire Retractable Air Flow Gate system and is bolted to the tractor frame (5). The support frame (9) is attached to the rack (15). This view is looking from the rear of the tractor forward to the cab. The electrical system, computer and speed sensor are housed in a weather proof control box (16) is mounted to the bottom center of the support frame (9). An optional (not shown) solar panel would be mounted horizontally on the top center part of the rack (15).
Figure 5:
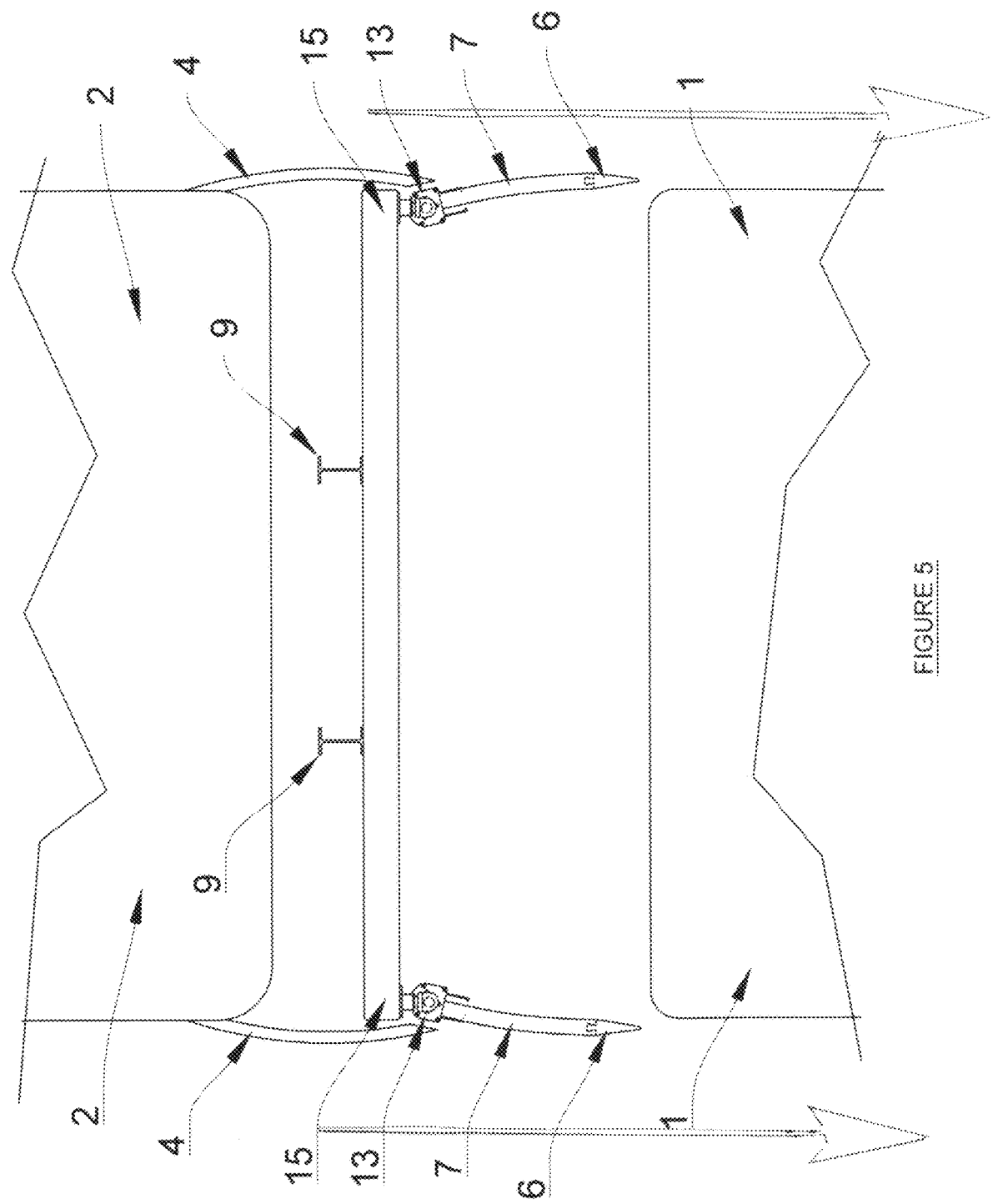
FIG. 5 This is a top view of the Retractable Air Flow Gate System placed between the cab extenders (4) of the tractor (2) with the air foil gates (7) in the open position showing the air flow moving evenly from the tractor (2) and trailer (1) thus decreasing the drag and turbulence and increasing the fuel efficiency of the tractor (2) trailer (1) combination. The tractor (2) showing the cab extenders (4), the rack (15) which is attached to the support frame (9). The extrusions (8), the air foil gates (7), the rubber strips (6) and the adjustable hinges (13).
Figure 5A:
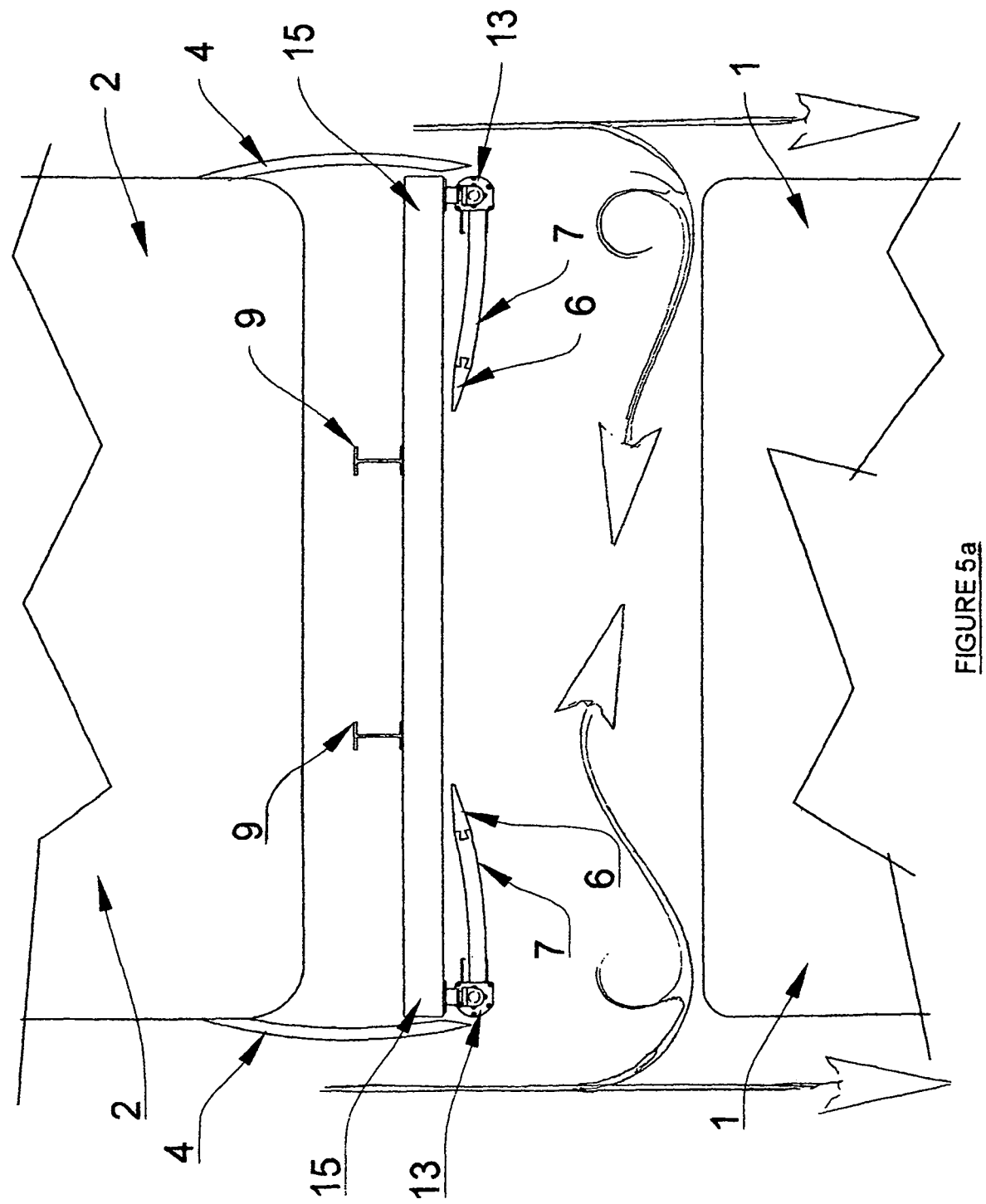
FIG. 5a This is a top view of the Retractable Air Flow Gate System placed between the cab extenders (4) of the tractor (2) with the air foil gates (7) in the closed position showing the air rushing between the tractor (2) and trailer (1) causing drag and turbulence which decreases the fuel efficiency. The rack (15) is attached to the support frame (9), the extrusions (8), the air foil gates (7), the rubber strips (6) and adjustable hinges (13) are in the closed position opening the gap (3) between the tractor (2) and trailer (1).

This invention claims:

1. A device for improving airflow around a tractor trailer comprising:
    a support frame configured to be mounted on a frame of a tractor behind a cab;
    a substantially rectangular rack comprised of two sets of substantially parallel sides mounted on said support frame;
    a pair of top adjustable hinges mounted on a top end of each of two respective parallel sides;
    a pair of bottom adjustable hinges mounted on a bottom end of the each of two respective parallel sides;
    a hollow extrusion supported by each of the pair of bottom adjustable hinges and extending parallel to each to two respective parallel sides;
    an electric gear driven motor positioned inside a top end of each of the hollow extrusions;
    an air foil gate extending perpendicularly from each of the hollow extrusions;
    wherein the electric gear driven motor folds the airfoil gates from a retracted position to an extended position between the trailer and the cab to reduce drag and improve fuel efficiency of the tractor trailer.

2. The device of claim 1 wherein each air foil gate comprises a rubber strip mounted on a side distal from said hollow extrusion.

3. The device of claim 1 wherein the electric gear driven motors are configured to be controlled by a sensor speed control module comprising a speed sensor and a computer; the electric gear driven motor and sensor speed control module are powered by a 12 volt power supply of the tractor trailer or a solar panel mounted on said rack.

* * * * *